(12) United States Patent
Zoltowski et al.

(10) Patent No.: US 7,042,959 B2
(45) Date of Patent: May 9, 2006

(54) DSP-BASED VARIABLE APERTURE CODE GENERATION TECHNIQUE

(75) Inventors: Michael David Zoltowski, West Lafayette, IN (US); Gregory John Tomezak, Waterford, MI (US); James Vincent Krogmeier, West Lafayette, IN (US); Chandra Mohan, Carmel, IN (US); Zhiming Zhang, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 903 days.

(21) Appl. No.: 10/140,677

(22) Filed: May 8, 2002

(65) Prior Publication Data

US 2003/0156660 A1 Aug. 21, 2003

Related U.S. Application Data

(60) Provisional application No. 60/358,320, filed on Feb. 20, 2002.

(51) Int. Cl.
*H03C 1/52* (2006.01)
*H03K 7/08* (2006.01)

(52) U.S. Cl. ...................... 375/301; 375/238
(58) Field of Classification Search ................ 375/261, 375/286, 303, 211; 332/108, 170; 341/127, 341/133; 389/183–185
See application file for complete search history.

(56) References Cited

U.S. PATENT DOCUMENTS

| | | | | |
|---|---|---|---|---|
| 3,879,661 A * | 4/1975 | Collins | .................... | 324/76.24 |
| 3,955,142 A * | 5/1976 | Frank et al. | ................ | 340/7.49 |
| 3,955,143 A * | 5/1976 | Collins | ........................ | 375/301 |
| 4,107,470 A * | 8/1978 | Maruta | ........................ | 380/28 |
| 4,803,739 A | 2/1989 | Daikoku et al. | .............. | 455/47 |
| 4,878,251 A | 10/1989 | Richardson | ................. | 455/206 |
| 4,994,769 A * | 2/1991 | Kishi | ......................... | 332/170 |
| 5,253,270 A * | 10/1993 | Petit | ........................... | 375/270 |
| 5,631,610 A * | 5/1997 | Sandberg et al. | ........... | 332/170 |
| 5,631,969 A * | 5/1997 | Hanson | ...................... | 381/107 |
| 5,783,974 A * | 7/1998 | Koslov et al. | .............. | 332/103 |
| 6,272,226 B1 * | 8/2001 | Khan et al. | ..................... | 381/4 |
| 6,775,324 B1 * | 8/2004 | Mohan et al. | .............. | 375/238 |
| 6,862,317 B1 * | 3/2005 | Mohan et al. | .............. | 375/238 |
| 6,973,188 B1 * | 12/2005 | Seitner | ........................ | 380/38 |

OTHER PUBLICATIONS

Tseng et al., Design of Discrete-Time Fractional Hilbert Transformer, May 28-31, 2000, The 2000 IEEE International Symposium on Circuits and Systems, vol. 5, pp. 525-528.*
PCT International Application Publication WO99/46864 Mohan, Chandra "Digital Signal Modulation System".
U.S. Appl. No. : 09/626,294 Mohan, Chandra "A Modulation Technique Providing High Data Rate Through Band Limited Channels".

* cited by examiner

*Primary Examiner*—Emmanuel Bayard
*Assistant Examiner*—Lawrence B. Williams
(74) *Attorney, Agent, or Firm*—Joseph J. Laks; Robert B. Levy

(57) ABSTRACT

Variable Aperture Coded (VAC) signals for VAC modulation are advantageously generated by a digital signal processor (12) that yields a VAC signal having a single narrow peak in the positive frequency region. A Discrete-Time Hilbert transformer (12) isolates only the positive spectral peaks, thus yielding a VAC signal that affords greater control over zero crossings.

20 Claims, 6 Drawing Sheets

DSP-BASED VARIABLE APERTURE CODE GENERATION TECHNIQUE

CROSS REFERENCE TO RELATED APPLICATION

This application claims priority under 35 U.S.C. 119(e) to U.S. Provisional Patent Application Ser. No. 60/358,320, filed Feb. 20, 2002, the teachings of which are incorporated herein.

TECHNICAL FIELD

This invention relates to a technique for generating Variable Aperture Codes (signals) for Variable Aperture Coded (VAC) signal modulation.

BACKGROUND ART

Certain radio frequency (RF) signal modulation techniques such as quadrature amplitude modulation (QAM) and quadrature phase shift keying (QPSK) suffer from the loss of signal power with increasing modulation levels. Such techniques also yield errors because of a low signal-to-noise ratio (SNR). Compensation for such errors requires bandwidth compression by an amount approximately equal to the square of the power increase. Modulation techniques such as frequency shift keying (FSK), Guassian minimum shift keying (GMSK) and QAM transmit non-return to zero (NRZ) line-coding offer bandwidth savings by concentrating the bandwidth around a carrier. Bi-phase coding serves to keep information sidebands away from the carrier. Further bandwidth savings can be achieved by transmitting on a single sideband.

U.S. patent application Ser. No. 09/623,776, filed on Sep. 8, 2000, in the name of Chandra Mohan et al., and assigned to Thomson Consumer Electronics, Inc. (incorporated by reference herein) describes a variable aperture coding (VAC) system for use in spread spectrum transmission that provides for multiple phase coding of an input NRZ bit stream to afford improved bandwidth compression. The VAC coding scheme disclosed in the Mohan et al. '776 application utilizes analog circuitry for generating the VAC signals that subsequently undergo band pass filtering by an Intermediate Frequency (IF) stage. Such band pass filtering tends to smear the edges of the original VAC signal resulting in a loss of control of the zero crossings.

Thus, there is a need for a technique for generating VAC signals that require no band pass filtering to convert to the carrier frequency, thus affording greater control over the zero crossings.

BRIEF SUMMARY OF THE INVENTION

Briefly, in accordance with a preferred embodiment, there is provided a method for generating a variable aperture coding (VAC) signal that overcomes the aforementioned disadvantage. In accordance with the present principles, a digital signal processor (DSP)generates discrete time VAC waveform having a sinusoidal shape. The digitally generated VAC waveform will have a single spectral peak in the positive frequency region, which is then isolated, typically by a Discrete-time Hilbert Transformer, along with a surrounding portion of the spectrum, to yield a single side band (SSB) VAC signal.

Generating a SSB VAC signal in this manner achieves a waveform that has a very narrow bandwidth and requires no band pass filtering. Indeed, the SSB VAC signal generated in this manner offers greater control over zero crossings, thereby avoiding smearing of zero crossings as occurred in the prior art.

DETAILED DESCRIPTION

Figure 1:
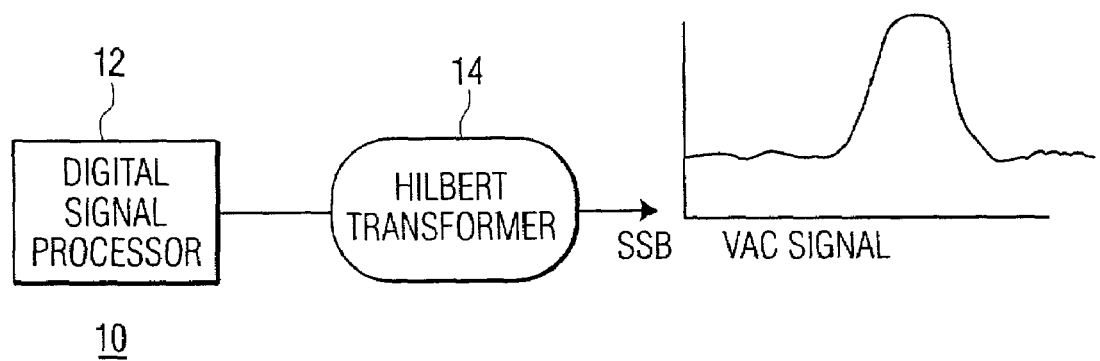
FIG. 1 depicts a block schematic diagram of an apparatus in accordance with the present principles for digitally generating a SSB VAC signal.

FIG. 1 depicts an apparatus 10 in accordance with present principles digitally generating a single side band (SSB) VAC. The apparatus 10 comprises a digital signal processor (DSP) 10 that digitally synthesizes sinusoidal waveforms that are interpolated, typically via a sinc function, to yield a discrete time VAC signal that exhibits a single narrow spectral peak. A low-order discrete time Hilbert transformer 12 isolates the positive frequency portion of the VAC spectrum to yield the SSB VAC signal.

The SSB VAC signal generated by the apparatus of SP 12 of FIG. 1 takes the form of a three-state signal expressed mathematically as:

$$X_{vac} = \sum_{k=0}^{N}(-1)^k \rho_{I_k}(t-T_k) \qquad (1)$$

Figure 2:
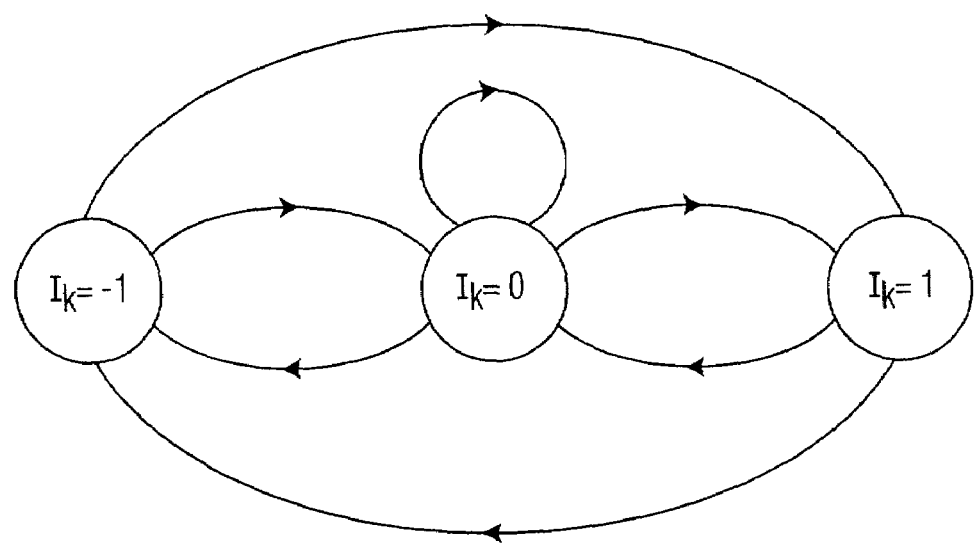
FIG. 2 depicts a state diagram of an exemplary Markov chain underlying SSB VAC generation by the apparatus of FIG. 1.

The subscript $I_k$ serves as an index value that can assume any of three integer values $k \in \{-1; 0; 1\}$ in accordance with the Markov chain of FIG. 2. Thus, If $I_k = -1$, then $\rho_{-1}(t)$ has a nominal duration of $(M-\Delta)Tc$ where M is an integer Tc is the clock period and $\Delta$ is typically 1 or 2;

If $I_k = 0$, then $\rho_0(t)$ has a nominal duration of MTc or

If $I_k = 1$, then $\rho_{+1}(t)$ has a nominal duration of $(M+\Delta)Tc$.

The time shift $T_k$ is a random variable that is generated in accordance with the relationship:

$$T_k = T_{k+1} + (M + I_k\Delta)T_c \quad (2)$$

with $T_0=0$. In practice, $\Delta=1$ although other values are possible.

The DSP 10 of FIG. 1 synthesizes sinusoidal waveforms $\rho_{-1}$, $\rho_0(t)$, and $\rho_{-1}(t)$ in accordance with the relationship:

$$\rho_{Ik} = \sum_{m=0}^{M+I_k\Delta-1} a_{Ik}^m \rho_{basis}(t - Tc - mTc) \quad (3)$$

where the basis function $\rho_{basis}(t)$ is a sinc function given by the relationship:

$$\rho_{basis}(t) = \frac{\sin\left(\pi\frac{t}{T_c}\right)}{\pi\frac{t}{Tc}} \quad (4)$$

While the basis function $\rho_{basis}(t)$ typically takes the form of a sinc function as described, other possibilities exist for the basis function to satisfy $\rho_{basis}(n\tau c)=\delta[n]$. For example, the basis function $\rho_{basis}(t)$ could take the form of a raised cosine function that satisfies the relationship $\rho_{basis}(n\tau c)=\delta[n]$. A raised cosine function satisfying such a relationship has tails that decay more quickly that the sinc function.

The values of the coefficients $\alpha_{Ik}^{(m)}$ appearing in Equation (3) are selected so that $X_{vac}$ appears as sinusoidal as possible and therefore has as small a bandwidth as possible. In practice, the following relationship has yielded very good results for the coefficients $\alpha_{Ik}^{(m)}$:

$$a_{Ik}^{(m)} = \sin\left(2\pi\frac{1}{2(M+I_k\Delta)T_c}t\right)\Big|_{t=nT_c} \quad (6)$$

Equation (6) can be simplified to:

$$a_{Ik}^{(m)} = \sin\left(\frac{\pi n}{M+I_k\Delta}\right) \quad (7)$$

$$n = 1, 2, \ldots M + I_k\Delta - 1$$

Figure 3:
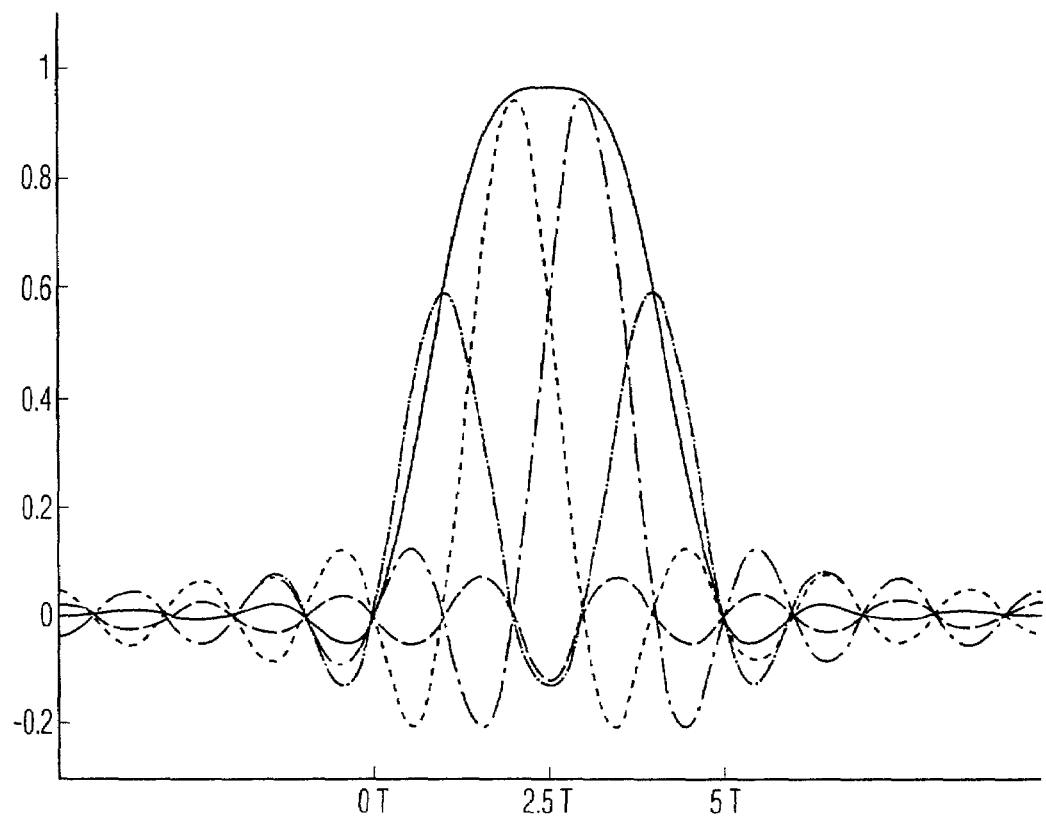
FIG. 3 depicts a 5T waveform generated by the apparatus of FIG. 1.
Figure 4:
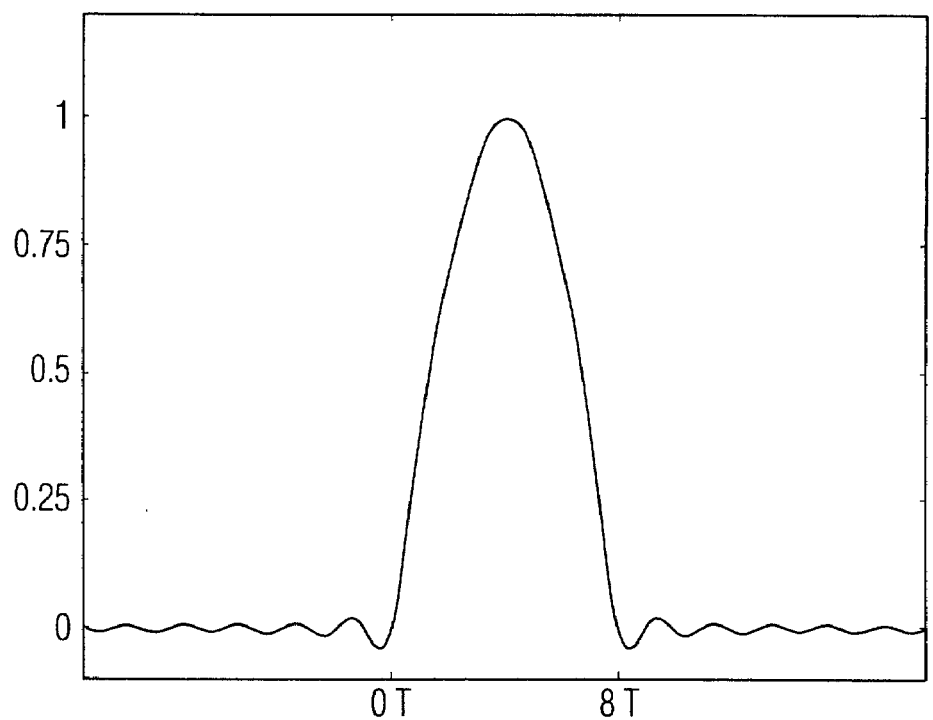
FIG. 4 depicts an 8T waveform generated by the apparatus of FIG. 1.
Figure 5:
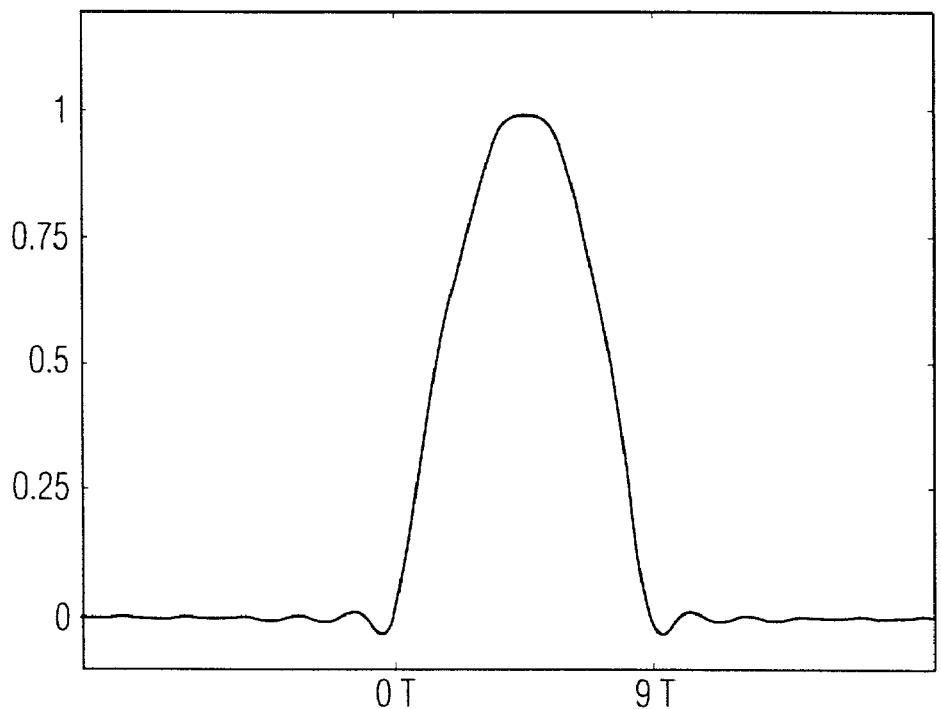
FIG. 5 depicts a 9T waveform generated by the apparatus of FIG. 1.
Figure 6:
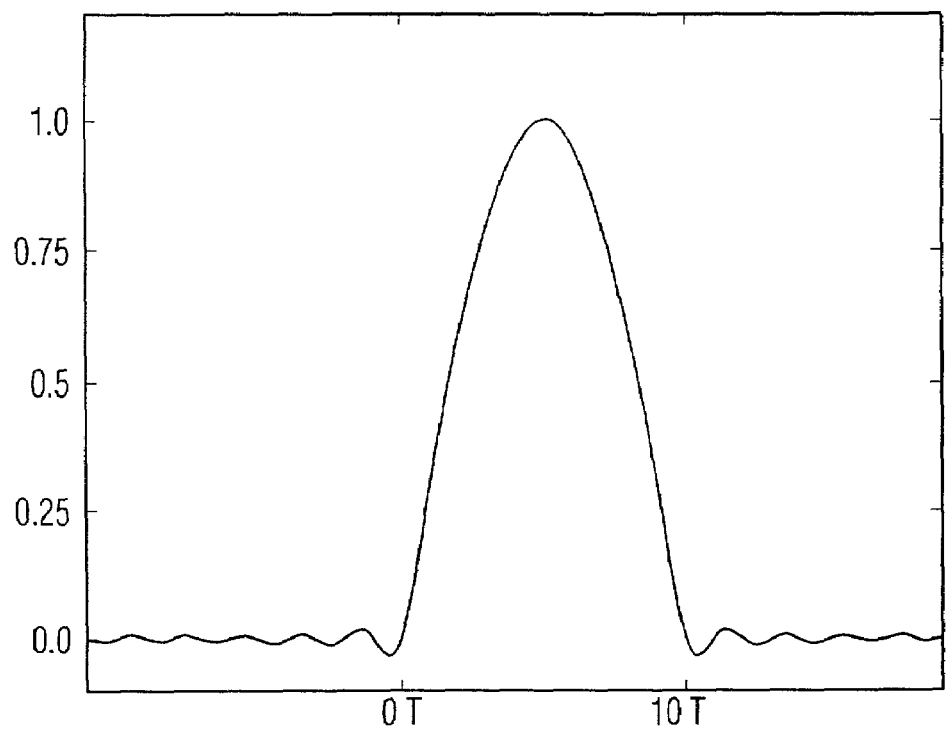
FIG. 6 depicts a 10T waveform generated by the apparatus of FIG. 1
Figure 7:
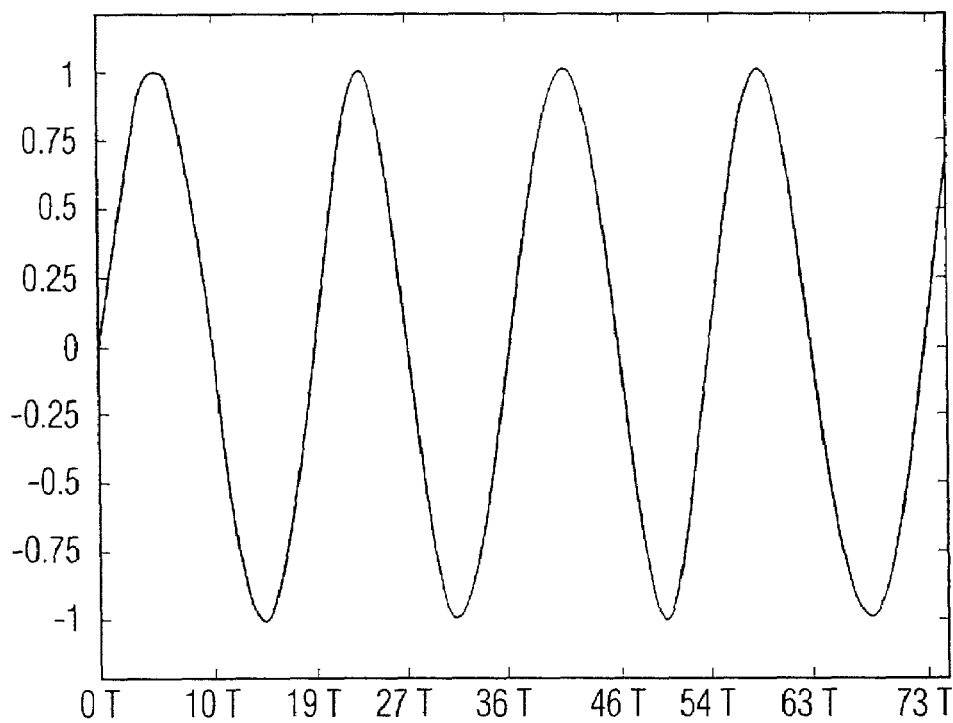
FIG. 7 depicts an 8-9-10 waveform generated by the apparatus of FIG. 1
Figure 8:
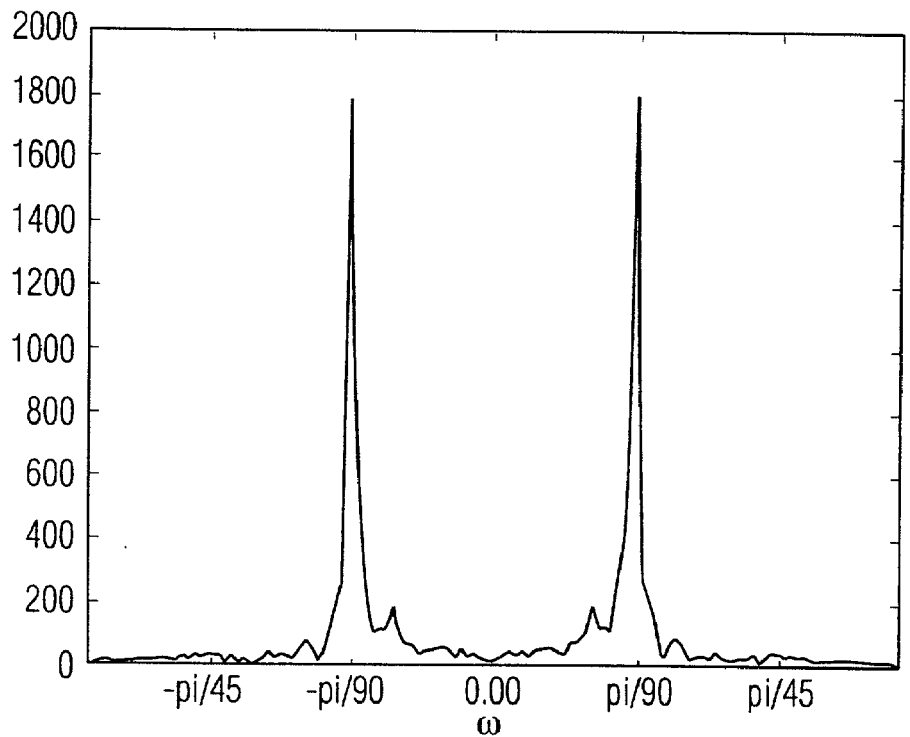
FIG. 8 depicts a portion of the 8-9-10 waveform of FIG. 7 with the spectral peaks enlarged.
Figure 9:
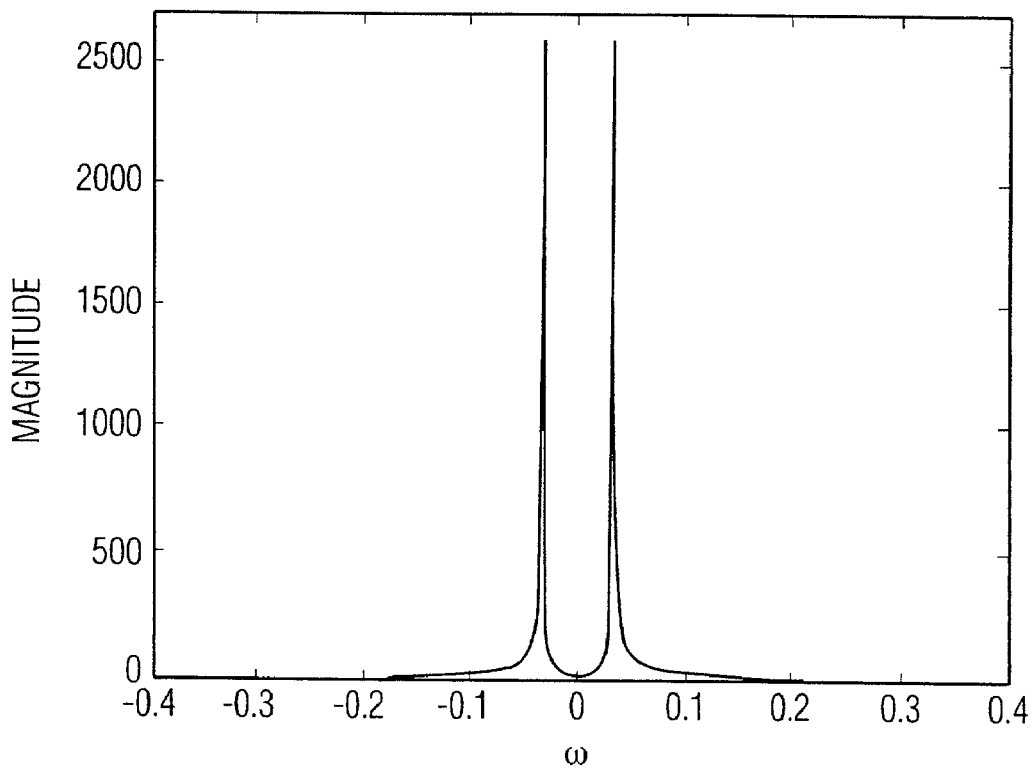
FIG. 9 depicts a portion of an 8-9-10 waveform comprised of an ensemble average of different sample spectra of the digital VAC signal generated by the apparatus of FIG. 1.
Figure 10:
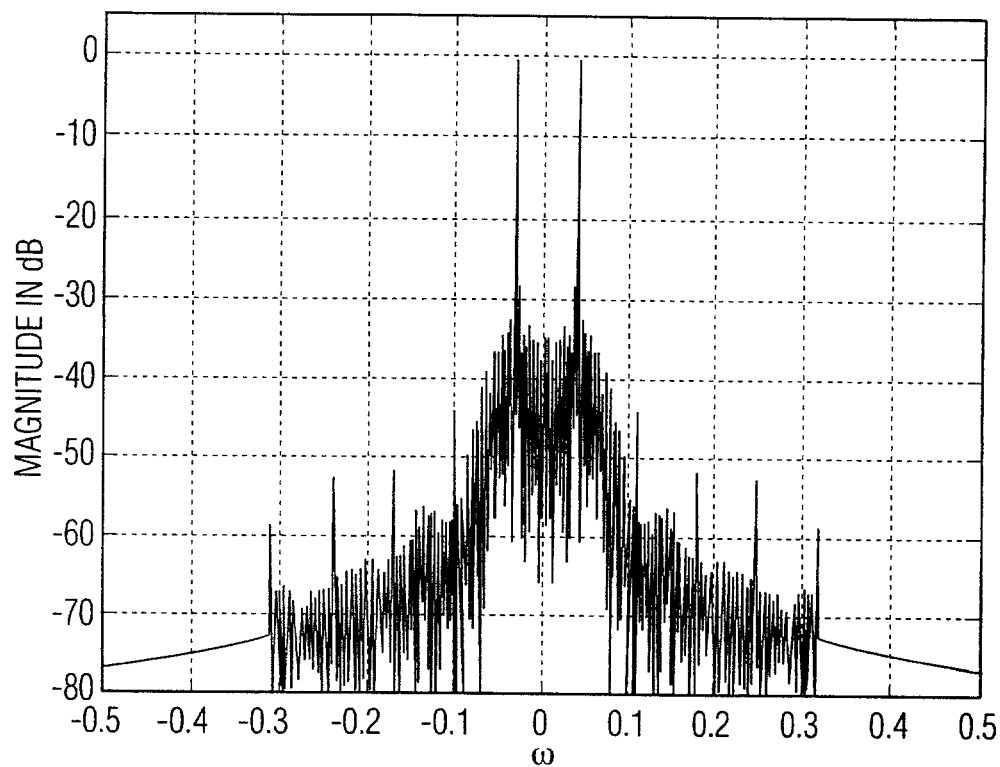
FIG. 10 depicts a portion of an 8-9-10 waveform showing the spectrum of an enlarged segment of the signal produced by sinc pulse interpolation.
Figure 11:
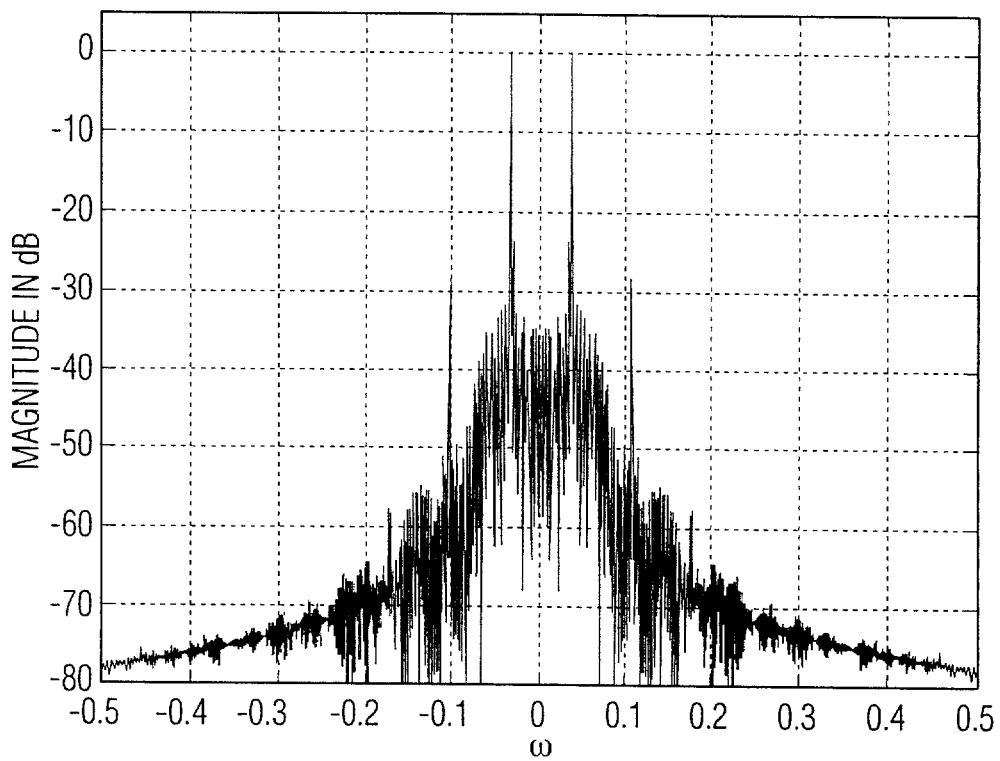
FIG. 11 depicts a portion of an 8-9-10 waveform showing the spectrum of an enlarged segment of signal produced by three-symbol truncated pulse interpolation.

As seen in FIG. 3, four sinusoidal signals resulting from four corresponding sinc functions, each calculated by the DSP 12 from the relationships of Equations (3) and (4), can be linearly combined to generate a "5T" waveform that is non-zero outside the interval from 0–5T. FIGS. 4–6 depict examples of "8T", "9T" and "10T" waveforms, respectively, produced in a similar manner. The individual 8T, 9T and 10T waveforms can be combined to yield an "8-9-10" waveform that appears in FIG. 7. FIG. 8 illustrates an enlarged view of the spectrum of a segment of the 8-9-10 waveform of FIG. 7, whereas FIG. 9 illustrates an ensemble average of different sample spectra in the 8-9-10 waveform of FIG. 7. FIG. 10 depicts an enlarged view of portion of the spectrum of a coded signal generated from 8-9-10 waveform of FIG. 7 using sinc pulse interpolation, whereas FIG. 11 depicts an enlarged view of portion of the spectrum of a coded signal generated from the 8-9-10 waveform of FIG. 7 using three symbol truncated pulse interpolation.

Generating a SSB VAC waveform with the apparatus 10 using the above-described mathematical relationships affords the advantage of yielding a VAC signal that has a very narrow bandwidth, thus obviating the need for IF filtering as required in the prior art. In other words, the SSB VAC produced by the apparatus of FIG. 1 can be converted directly to a carrier frequency.

As compared to the VAC signal generated in the prior art, the SSB VAC signal generated by the apparatus 10 of FIG. 1 yields greater control over zero crossings. The time between any two successive zero crossings in the SSB VAC signal of the present principles is exactly one of three possibilities, for example, 8T, 9T or 10T in the case of the 8-9-10 waveform of FIG. 7. In contrast, prior art VAC signals require IF filtering, which as discussed, tends to smear the edges of the signal. Maintaining well-defined edges in the VAC signal is important for accurate decoding by counting the time between zero crossings. Since the SSB VAC signal of the present principles has a constant envelope, the modulation scheme described above affords more efficient operation of the power amplifier (not shown) transmitting the SSB VAC signal. Further, the information carried by the SSB VAC signal of the present principles resides in the interval between zero crossings, thus making the VAC modulation scheme robust to fading.

As described above, the VAC waveform is generated by taking the sum of weighted sinc functions to form the nearly sinusoidal half cycle corresponding to a VAC encoding period. However, nearly sinusoidal half cycles can be generated corresponding to a VAC encoding period that does not necessarily require the sum of sinc function approach (i.e., the sum and weighted aggregate of 8,9 or 10 sinc pulses). Rather the VAC waveform can be generated using a windowing function that takes a square wave like VAC signal and rounds it off In this way, other types of windowing/smoothing functions can be employed that can give rise to nearly sinusoidal VAC signal after filtration through a Finite Impulse Response (FIR) filter (not shown). The emphasis here is on windowing function and FIR filtering on a nearly square wave like VAC signal.

While the DSP 10 does processing at a base band frequency, the DSP could perform processing at an Intermediate frequency instead of at base band. Under such circumstances, the base band signal can take the form of a Sum of Sinc or filtered/windowed square wave signals, but single sideband conversion is done at an intermediate frequency that is up-converted to a higher RF frequency by well known methods.

The foregoing describes a technique for digitally producing a SSB VAC signal that affords good control over zero crossings.

What is claimed is:

1. Apparatus for generating a single side band (SSB) variable aperture coded (VAC) signal, comprising:
   a digital signal processor for generating a discrete time VAC signal which has a sinusoidal shape and a spectral peak in a positive frequency range; and
   means for isolating the positive spectral peak and a portion of surrounding spectrum in the VAC signal generated by the digital signal processor.

2. The apparatus according to claim 1 wherein the isolating means comprises a Discrete-Time Hilbert transformer.

3. The apparatus according to claim 1 wherein the digital signal processor generates the discrete time VAC signal in accordance with the relationship:

$$X_{vac} = \sum_{k=0}^{N}(-1)^k \rho_{Ik}(t-T_k)$$

wherein
t is a running time value
$P_{Ik}$ is a periodic function
$I_k$ serves as an index value that can assume one of three integer values $k \in \{-1; 0; 1\}$ such that
If $I_k = -1$, then $\rho_{-1}(t)$ has a nominal duration of $(M-\Delta)Tc$ where
M and N are integers
$T_k$ is a random variable and $\Delta$ is 1 or 2;
Tc is the clock period
If $I_k = 0$, then $\rho_0(t)$ has a nominal duration of MTc or
If $I_k = 1$, then $\rho_{-1}(t)$ has a nominal duration of $(M+\Delta)Tc$.

4. The apparatus according to claim 3 wherein $T_k$ is generated in accordance with the relationship:

$$T_k = T_{k+1} + (M + I_k \Delta)T_c$$

with $T_0 = 0$ and $\Delta = 1$.

5. The apparatus according to claim 3 wherein $\rho_{-1}$, $\rho_0(t)$, and $\rho_{+1}(t)$ comprise sinusoidal waveforms obtained in accordance with the relationship:

$$\rho_{Ik} = \sum_{m=0}^{M+Ik\Delta-1} a_{Ik}^m \rho_{basis}(t - Tc - mTc).$$

6. The apparatus in accordance with claim 5 wherein $\rho_{basis}(t)$ is a sinc function given by the relationship:

$$\rho_{basis}(t) = \frac{\sin\left(\pi \frac{t}{T_c}\right)}{\pi \frac{t}{T_c}}.$$

7. The apparatus according to claim 5 wherein $\rho_{basis}(t)$ comprises a raised cosine function that satisfies the relationship $$\rho_{basis}(n\tau c) = \delta[n].$$

8. The apparatus according to claim 5 wherein coefficients $\alpha_{Ik}^{(m)}$ are given by the relationship $$a_{Ik}^{(m)} = \sin\left(\frac{\pi n}{M + I_k \Delta}\right)$$
$$n = 1, 2, \ldots M + I_k \Delta - 1.$$

9. A method for generating a single side band (SSB) variable aperture coded (VAC) signal, comprising the steps of:
digitally generating a discrete time VAC signal which has a sinusoidal shape and a spectral peak in a positive frequency range; and
isolating the positive spectral peak and a portion of surrounding spectrum in the digitally generated VAC signal.

10. The method according to claim 9 wherein the digitally generated VAC signal is synthesized in accordance with the relationship:

$$X_{vac} = \sum_{k=0}^{N}(-1)^k \rho_{Ik}(t-T_k)$$

wherein
t is a running time value
$P_{Ik}$ is a periodic function
$I_k$ serves as an index value that can assume one of three integer values $k \in \{-1; 0; 1\}$ such that
If $I_k = -1$, then $\rho_{-1}(t)$ has a nominal duration of $(M-\Delta)Tc$ where
M is an integer
$T_k$ is a random variable and
$\Delta$ is 1 or 2 ;
If $I_k = 0$, then $\rho_0(t)$ has a nominal duration of MTc or
If $I_k = 1$, then $\rho_{-1}(t)$ has a nominal duration of $(M+\Delta)Tc$.

11. The method according to claim 10 wherein $T_k$ is generated in accordance with the relationship:

$$T_k = T_{k+1} + (M + I_k \Delta)T_c$$

with $T_0 = 0$ and $\Delta = 1$.

12. The apparatus according to claim 10 wherein $\rho_{-1}$, $\rho_0(t)$, and $\rho_{+1}(t)$ comprise sinusoidal waveforms obtained in accordance with the relationship:

$$\rho_{Ik} = \sum_{m=0}^{M+Ik\Delta-1} a_{Ik}^m \rho_{basis}(t - Tc - mTc).$$

13. The method in accordance with claim 12 wherein basis function $\rho_{basis}(t)$ is a sinc function given by the relationship:

$$\rho_{basis}(t) = \frac{\sin\left(\pi \frac{t}{T_c}\right)}{\pi \frac{t}{T_c}}.$$

14. The method according to claim 12 wherein $\rho_{basis}(t)$ comprises a raised cosine function that satisfies the relationship $$\rho_{basis}(n\tau c) = \delta[n].$$

15. The method according to claim 12 wherein coefficients $\alpha_{Ik}^{(m)}$ are given by the relationship $$a_{Ik}^{(m)} = \sin\left(\frac{\pi n}{M + I_k \Delta}\right)$$
$$n = 1, 2, \ldots M + I_k \Delta - 1.$$

16. The method according to claim 9 wherein the VAC signal is generated by digitally generating a square wave signal and then applying a windowing function that rounds the square wave signal.

17. The method according to claim 16 further including the step of filtering the square wave signal by a Finite Impulse Response filter.

18. The method according to claim 9 including wherein the digital generation of the square wave signal is done at base band.

19. The method according to claim 9 wherein an intermediate square wave signal is digitally generated at base band and is converted to a single sideband signal at an intermediate frequency.

20. The method according to claim 19 wherein the single sideband signal is up converted to a higher RF frequency.

* * * * *